United States Patent Office 2,793,204
Patented May 21, 1957

2,793,204

PROCESS FOR THE SYNTHESIS OF PEPTIDES

Josef Ferdinand Arens, Groningen, Netherlands, assignor to N. V. Organon, Oss, Netherlands, a limited liability company No Drawing. Application March 26, 1956, Serial No. 573,651

Claims priority, application Netherlands March 29, 1955

14 Claims. (Cl. 260—112)

For the synthesis of peptides various methods are available. A detailed survey of such methods is given in the following articles: J. S. Fruton, Advances in Protein Chemistry 5, 1 (1949); Th. Wieland, Angew. Chemie 63, 7 (1951) and 65, 507 (1954).

In the syntheses which start from amino acids or lower peptides, use is generally made of a temporary blocking of one of the two reactive groups of the molecule to obtain identical products. In these coupling reactions the amino group of the first component is often protected and the carboxyl group is brought into a more reactive form, so that it can react with the free amino group of the second component, the carboxyl group of which is protected preferably by esterification.

For temporarily blocking the amino group use is frequently made of the conversion of the amino acid or the peptide into the carbobenzyloxy compound which has the advantage that herefrom in a mild way, e. g. by reduction, the free amino compound can again be prepared. In N-acylated compounds the amino group can only be set free by the action of a hydrolysing agent, in which it should be seen to that no peptide bond is broken.

Of the known methods to form a peptide bond are mentioned: the method by Curtius, in which the carboxyl group of the first reaction component is converted into the acid azide group which can react with a free amino group of the second reaction component; the method by G. W. Anderson, see J. Am. Chem. Soc. 74, 5309 (1952), in which use is made of tetraethylpyrophosphite as a coupling agent; the method by Emil Fischer, in which the amino acid is converted into the corresponding acid chloride e. g. with phosphorpentachloride or thionylchloride.

Recently a new method for the formation of a peptide bond was published by J. C. Sheehan and G. P. Hess, see J. Am. Chem. Soc. 77, 1067 (1955). In this method use is made of dicyclohexylcarbodiimide with the formula: $C_6H_{11}-N=C=N-C_6H_{11}$, a reagent which in many cases acts as if it were a very strong dehydrating agent It is capable of coupling a N-acylated amino acid with an amino acid ester. As by-product there is formed the urea derivative of the formula:

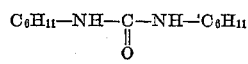

It has been found now that in a very simple way a similar peptide bond can be brought about by means of an acetylene ether. For this purpose an amino acid or peptide, the amino group of which has been blocked temporarily, is coupled with an amino acid or peptide, the carboxyl group of which has been blocked, in the presence of an alkoxy-acetylene, which by the addition of the water formed in the coupling, is converted into an acetic ester.

This method has the great advantage that the reaction takes place even at a temperature as low as room temperature and that the separation of the formed peptide from the reaction mixture is extremely simple; for, only the volatile acetic ester need to be distilled to obtain the peptide in a pure form. The resulting yields of peptides are good. A further important advantage of this method is that the hydroxyl group of the hydroxyamino acids tyrosine, serine, and threonine need not be protected.

Preferably an acetylene ether is applied which is derived from an aliphatic alcohol with a low molecular weight, such as methanol, ethanol, propanol, isopropanol, a butanol, and amylalcohol. The methoxy acetylene which is the most volatile (boiling point 22° C.) is preferred as a coupling agent.

The reaction is preferably carried out between room temperature (about 20°) and 60° C. Very suitable as starting products are the amino acids or peptides, in which the amino group is protected by the carbobenzyloxy (Cbz)-group. For, in general, these Cbz compounds are smoothly formed; in addition the Cbz-group can be split in several ways, e. g. by reduction, treatment with HBr in glacial acetic acid, with Na in liquid ammonia and with $PH_4J$. However, also acyl groups, in particular the "leicht abspaltbare Acylgruppen" mentioned by Wieland in his survey, the sulfonyl group, the phthaloyl group, and in additional the benzyl group and the triphenylmethyl group are suitable for the temporary blocking of the $NH_2$-group.

The carboxyl group of the second reaction component is preferably blocked by esterification with a lower aliphatic alcohol, e. g. methanol, ethanol, butanol, or with benzyl alcohol. Preferably a small excess of the acetylene ether is applied. After completion of the coupling reaction the blocked amino group and carboxyl group of the formed peptide can be set free according to a method known per se.

As examples of reaction components for this synthesis are mentioned: N-Cbz-L-leucine and glycine ethyl ester, N-Cbz-S-benzyl-cysteine and glycine methyl ester, N-Cbz-L-glutaminic acid-α-ethyl ester and S-benzyl-L-cysteinyl-glycine ethyl ester, tosyl-L-isoleucine and L-alanine methyl ester, dibenzyl-glycine and DL-serine ethyl ester, N-Cbz-glycine and glycine ethyl ester, N-Cbz-glycine and L-phenylalanine benzyl ester, N-Cbz-L-nitroarginine and L-alanine methyl ester, N-phthaloyl-L-alanine and L-prolinebenzyl ester, N-trityl-DL-alanine and tryptophanemethyl ester.

It has appeared that the method according to the invention is especially suitable for the preparation of higher peptides. For this purpose the N-protecting group is split from the resulting coupling product as a result of which a free $NH_2$-group is formed and this is coupled e. g. with a new N-acylamino acid in the presence of an acetylene ether according to the following reaction scheme:

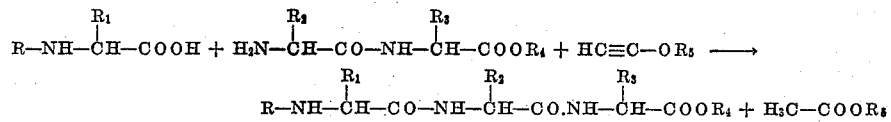

similar peptide bond can be brought about by means of an acetylene ether. For this purpose an amino acid or peptide, the amino group of which has been blocked temporarily, is coupled with an amino acid or peptide, the carboxyl group of which has been blocked, in the presence of an alkoxy-acetylene, which by the addition of the water formed in the coupling, is converted into an acetic ester.

Here R represents a group which blocks the $NH_2$ group, e. g. a Cbz, acyl, sulfonyl, $R_1$, $R_2$ and $R_3$ represent sidechains of amino acids and $R_4$ and $R_5$ e. g. an alkyl, aryl, or aralkyl group. It is also possible first to split the residue bound to the carboxyl group ($R_4$), e. g. a benzyl group by catalytic reduction and a methoxy or ethoxy group, by careful alkaline hydrolysis, and coupling the resulting product with a new amino acid or peptide ester according to the following reaction scheme:

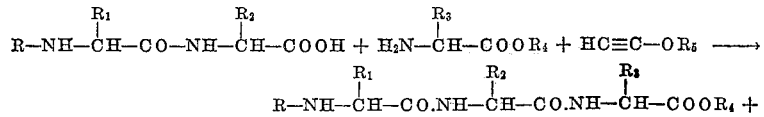

In the coupling reactions carried out by means of an acetylene ether no racemisation occurs of the optical active reaction components.

The process according to the invention is preferably carried out as follows: an intimate mixture is prepared of e. g. a N-Cbz-monoamino-monocarboxylic acid and an ester of a mono-amino-monocarboxylic acid in equimolecular quantities whether or not in a solvent. For this purpose an indifferent liquid may be used, such as ether, dichloro methane, ethyl acetate, dioxan, and nitromethane. To this is added an excess of acetylene ether (at least 1 mol per mol of N-Cbz-amino acid). The reaction occurs in a short time under spontaneous heat development or is brought about by heating in a water-bath. The process is carried out by the addition of a solvent, washing with an icy-cold potassium carbonate solution, to dissolve any N-Cbz-amino acid still present, then washing with an icy-cold 0.5 N hydrochloric acid solution to remove any amino acid ester still present, and finally with water. After drying the solution on anhydrous sodium sulphate the solvent is removed by evaporation in which the peptide ester crystallises. This is either applied for further coupling with one of the above described methods, or converted into the free peptide.

In the synthesis of peptides starting from diamino-monocarboxylic acid, use is e. g. made of the dicarbobenzyloxy derivatives thereof. Otherwise the procedure is the same as described above.

For the preparation of cysteine peptides also the SH-group of the cysteine must be protected, which is preferably carried out by a benzyl group. It is noted that the acetylene ethers can also be used for the formation of acid amides derived from the N-acylamino acids, namely by reacting the N-acyl-amino acid with a primary or secondary amine in the presence of an acetylene ether. In a corresponding manner an ester can be prepared from a N-acylamino acid and an alcohol. The formed amides and esters may be applied in the present syntheses.

As a solvent in which the coupling reaction is preferably carried out ethyl acetate is taken, in which many N-acyl or N-carbobenzyloxy amino acids and corresponding peptides dissolve.

It was still found that the syntheses according to the invention can be strongly simplified by starting from the hydrochloric salt of amino acid esters or peptide esters as second reaction component. In this case equivalent quantities of the amino acid or peptide, of which the nitrogen has e. g. been blocked by a Cbz-group, and the amino acid ester or peptide ester hydrochloride are dissolved in an alcohol, to which an excess of acetylene ether is added, and the reaction mixture is heated in a closed vessel at about 50 to 80° for 3 hours. The process is carried out by removing the excess of acetylene ether in vacuo, adding a little solvent, e. g. ethyl acetate, and washing successively, each time twice, with water, 1 N hydrochloric acid, water, potassium carbonate solution, and water. The solution is finally dried and evaporated, in which the peptide ester crystallises. This method offers a great advantage, since it is not necessary now to prepare the free amino acid or peptide ester from the hydrochloric salts thereof, which is time consuming and is sometimes attended with difficulties.

As examples of hydrochloric salts of amino acid esters or peptide esters, which may be applied as second reaction component are mentioned the hydrochloric salts of glycine-ethyl ester, glycine-methyl ester, S-benzyl-L-cysteinyl-glycine-ethyl ester, L-alanine-methyl ester, D-leucine methyl ester, DL-serine-ethylester, L-phenylalanine benzyl ester, L-alanine-ethyl ester, L-leucine-ethyl ester, L-prolinebenzyl ester, tryptophane-methyl ester.

The reaction is preferably carried out by boiling the reactants under reflux in ethyl acetate.

EXAMPLE I

*N-Cbz-L-leucyl-glycine-ethylester*

Equimolecular quantities of glycine-ethyl ester and N-Cbz-L-leucine are mixed with methoxy acetylene (1.3 mol per mol of glycine ester). The mixture is heated under reflux in a water-bath of 50° C. for 3 hours. A homogeneous solution is formed. This is cooled, ether is added, and the mixture is washed successively with an icy-cold potassium carbonate solution, water, an icy-cold 0.5 N hydrochloric acid solution, and water, and the solution is dried on sodium sulphate. The ether is evaporated slowly, in which the peptide crystallises. The crystals are sucked off and washed with a little icy-cold ether. The M. P. of this peptide ester amounts to 102–104° C.

EXAMPLE II

*N-Cbz-S-benzyl-cysteinyl-glycine-ethyl ester*

A mixture of N-Cbz-S-benzyl-cysteine, glycine ethyl ester, and ethoxy acetylene in the mol ratio 1:1:2 is dissolved in ethyl acetate and heated at 60° C. for 3 hours. Then the reaction mixture is washed successively with 2 N hydrochloric acid solution, water, 2 N soda solution, and once again with water. The mixture is dried on sodium sulphate and the solvent is distilled under reduced pressure. The residue is crystallised from ethyl acetate-petroleum ether. The yield amounts to 90%. The M. P. of this peptide is 98° C. $(\alpha)_D^{20} = -26.5°$ (in glacial acetic acid, C=6).

EXAMPLE III

*(N - Cbz - γ - L - glutamyl) - S - benzyl - L - cysteinyl - glycinedi-ethyl-ester (=N-Cbz-S - benzyl - glutathiondiethyl ester)*

In a large excess of methoxyacetylene a mixture of equimolecular quantities of S-benzyl-L-cysteinyl-glycine-ethyl ester and N-Cbz-L-glutaminic acid-α-ethyl ester is heated under reflux. After two hours the mixture is cooled and diluted with ethyl acetate. It is washed successively with 2 N hydrochloric acid, water, a saturated sodium bicarbonate solution, and again with water. The solution is dried on sodium sulphate and evaporated to a small volume. By the addition of some petroleum ether the crystallisation of tripeptide is promoted. It is recrystallised from dilute alcohol. The yield amounts to 70%; the M. P. is 105° C.

EXAMPLE IV

*Tosyl-L-isoleucyl-glycine ethyl ester*

1.45 g. of tosyl-L-isoleucine (M. P. 135°), 2.2 g. of glycine ethyl ester and 2 ml. of methoxyacetylene are boiled under reflux with 10 ml. of ether for 5 hours. The light-yellow precipitate is filtered and stirred with cold soda solution. Subsequently it is washed with water and recrystallised from alcohol. The yield amounts to 60%, the M. P. is 158–159° C.

EXAMPLE V

N-(N',N'-dibenzylglycyl)-DL-serine

A solution of equimolecular quantities of N,N-dibenzylglycine and DL-serine-ethyl ester in dimethylformamide with 1.5 ml. of methoxyacetylene is heated for 3 hours. Then the solvent is removed in vacuo, the formed residue is dissolved in ethanol and alcoholic alkali is added to the solution (1 equivalent per mol of serine-ethyl ester). After boiling for 10 minutes the mixture is evaporated in vacuo, the residue is taken up in water, after which the solution is filtered and acidified with acetic acid. On oily substance precipitates which is taken up in chloroform. By extracting the chloroform solution with hot hydrochloric acid, followed by cooling of the resulting solution a crystalline precipitate of the chlorohydrate of the desired substance is obtained. The yield amounts to 60%; the M. P. is 165° C. (decomposition).

EXAMPLE VI

N-Cbz-glycinanilide

To a mixture of equimolecular quantities of N-Cbz-glycine and aniline a double excess (2 mols) of methoxy acetylene is added. The flask is connected with a reflux condenser. After some time the reaction mixture becomes spontaneously warm; it melts and then crystallises again. The resulting product is recrystallised from methanol. The M. P. of the formed substance is 145–146° C.

EXAMPLE VII

N-trityl-DL-alanyl-tryptophane methyl ester

To an equimolecular mixture of N-trityl-DL-alanine and tryptophane methyl ester an equimolecular quantity of ethoxy acetylene is added. After heating the mixture at 50° C. for a short time the reaction is completed. The resulting peptide is recrystallised from benzene. It is obtained in a yield of 80% with a M. P. of 211–213° C.

EXAMPLE VIII

N-Cbz-glycyl-L-phenylalanine-benzyl ester

A mixture of equimolecular quantities of N-Cbz-glycine and L-phenylalaninebenzyl ester is heated at 60° with 1.3 mols of methoxy acetylene. Ethyl acetate is used as a solvent. After 1 hour some more ethyl acetate is added and the resulting mixture is cooled and washed successively with soda solution, water, 1 N hydrochloric acid solution, and water. After drying on sodium sulphate the solution is evaporated. The resulting oil is recrystallised from ethyl acetate. The yield of crystals is 90%; the M. P. is 74° C.

EXAMPLE IX

N-phthaloyl-L-alanyl-L-prolinebenzyl ester

Equimolecular quantities of N-phthaloyl-L-alanine and L-prolinebenzyl ester are heated on a water-bath (bath-temperature 50°) in a little methylene chloride with 1.5 equivalent of methoxy acetylene for 3 hours. The reaction mixture is evaporated in vacuo. The residue is taken up in ethyl acetate, washed with dilute soda solution and then with dilute hydrochloric acid. The resulting solution is dried on sodium sulphate, after which the solution is evaporated slowly. The resulting crystals are recrystallised from ethyl acetate-petroleum ether. They have a M. P. of 100–102° C.

EXAMPLE X

N-Cbz-glycyl-glycine-ethyl ester

Equimolecular quantities of N-Cbz-glycine and the hydrochloric salt of glycine ethyl ester are dissolved in ethyl alcohol. An excess of methoxy acetylene is added. The mixture is heated in a closed flask at 50° for 3 hours. Subsequently the excess of methoxy acetylene is removed in vacuo, some ethyl acetate is added to the residue and the mixture is thoroughly washed successively with water, 1 N hydrochloric acid (2x), once again water (2x), and a solution of potassium carbonate (2x) and finally again with water (2x). Then the mixture is dried on sodium sulphate and evaporated. The N-Cbz-glycyl-glycine-ethyl ester crystallises. The M. P. amounts to 79–80° C.

I claim:

1. In a process of preparing peptides, the step comprising condensing a compound selected from the group consisting of an amino acid and a peptide having a free carboxyl group, with a compound selected from the group consisting of an amino acid and a peptide having a free amino group, by means of an acetylene ether as condensing agent.

2. The process according to claim 1, wherein condensation is carried out at a temperature between about 50° C. and about 80° C.

3. The process according to claim 1, wherein condensation is carried out in ethyl acetate.

4. The process according to claim 1, wherein condensation is carried out by means of an excess of the condensing agent.

5. In a process of preparing peptides, the step comprising condensing a compound selected from the group consisting of an amino acid and a peptide having a free carboxyl group, with a compound selected from the group consisting of an amino acid and a peptide having a free amino group, by means of methoxy acetylene as condensing agent.

6. In a process of preparing peptides, the step comprising condensing an N-carbobenzyloxy amino acid with an amino acid ester by means of an acetylene ether as condensing agent.

7. In a process of preparing peptides, the step comprising condensing an N-carbobenzyloxy amino acid with a peptide having a free amino group and an esterified carboxyl group, by means of an acetylene ether as condensing agent.

8. In a process of preparing peptides, the step comprising condensing a peptide having a free carboxyl group and a carbobenzyloxy amino group, with an amino acid ester by means of an acetylene ether as condensing agent.

9. In a process of preparing peptides, the step comprising condensing a peptide having a free carboxyl group and a carbobenzyloxy amino group, with a peptide having a free amino group and an esterified carboxyl group, by means of an acetylene ether as condensing agent.

10. In a process of preparing peptides, the step comprising condensing a compound selected from the group consisting of an amino acid and a peptide having a free carboxyl group, with the hydrochloride of an ester of a compound selected from the group consisting of an amino acid and a peptide having a free amino group, by means of an acetylene ether as condensing agent.

11. In a process of preparing peptides, the step comprising condensing an N-carbobenzyloxy amino acid with the hydrochloride of an amino acid ester by means of an acetylene ether as condensing agent in alcoholic solution.

12. In a process of preparing peptides, the step comprising condensing an N-carbobenzyloxy amino acid with the hydrochloride of a peptide having a free amino group and an esterified carboxyl group, by means of an acetylene ether as condensing agent in alcoholic solution.

13. In a process of preparing peptides, the step comprising condensing a peptide having a free carboxyl group and a carbobenzyloxy amino group, with the hydrochloride of an amino acid ester by means of an acetylene ether as condensing agent in alcoholic solution.

14. In a process of preparing peptides, the step comprising condensing a peptide having a free carboxyl group and a carbobenzyloxy amino group, with the hydrochloride of a peptide having a free amino group and an esterified carboxyl group, by means of an acetylene ether as condensing agent in alcoholic solution.

References Cited in the file of this patent

Jacobs et al.: J. Am. Chem. Soc., vol. 66, pp. 686–9 (1944).

Arens et al.: Chem. Abst., vol. 45, col. 6152 (1951).

Queck: Chem. Abst., vol. 48, col. 1238 (1954).

Sheehan et al.: J. Am. Chem. Soc., vol. 77, pp 1067–8 (1955).